UNITED STATES PATENT OFFICE.

ERNST C. KRUEGER AND JOHN W. MANN, OF CHICAGO, ILLINOIS.

PARTING-POWDER.

1,049,496. Specification of Letters Patent. Patented Jan. 7, 1913.

No Drawing. Application filed March 1, 1911. Serial No. 611,644.

*To all whom it may concern:*

Be it known that we, ERNST C. KRUEGER and JOHN W. MANN, citizens of the United States, and residents of Chicago, in the county of Cook and State of Illinois, have invented certain new and useful Improvements in Parting-Powders; and we do hereby declare that the following is a full, clear, and exact description thereof.

This invention relates to improvements in what is known as parting compounds or powders for dusting the patterns used in making sand molds in foundries to facilitate the parting of the sand from the patterns.

Among the objects of the invention is to provide a parting powder which is exceedingly economical to produce, which is exceedingly light in weight as compared to its bulk, which is non-adhesive so that it will not stick to the patterns when the molding sand is heated, and which is non-fusible.

Our improved parting powder consists essentially of the residue of a vegetable bark from which has been extracted or partially extracted the natural acids thereof, such as tannic acid, and which is dried and ground to form a light, impalpable powder of porous texture.

In order to avoid absorption of moisture by the powder and to preserve the powder, we may incorporate therewith a filling or coating substance to fill and coat the particles. Such filling or coating substance may be an oleaginous substance, such as linseed oil, cotton seed oil, or oil bearing substances, such as crushed linseed or cotton seed, the latter being mixed with the pulverized vegetable bark.

The vegetable fibrous bark which we employ may consist of the residue of tan bark, after the same has been used in the tanning pit for tanning leather, and in which process the greater portion of the tannic acid has been withdrawn or extracted. The residue of the bark, when used, is first dried, and is afterward ground or reduced to pulverulent form, in which condition it is ready for use as a parting powder. If necessary the pulverized material may be screened to reduce it to the desired uniform mesh. The filling and coating substance, such as a vegetable oil or oil bearing substance, when used, is mixed thoroughly with the pulverized bark, and during the mixing process the mixture is subjected to heat so as to drive off or partially burn away a portion of the filling and coating substance and to drive the same into the porous particles of the vegetable material. Thereafter the compound is allowed to cool. The temperature to which the mixture is raised to drive off a portion of the oleaginous constituent of the mixture is such as not to burn away the pulverulent porous body of the mixture. Where tan bark refuse cannot be had we may employ refuse product of tannic acid manufacture.

The proportions of the porous powdered material and the filling and coating substance will depend upon the capacity of the porous material to absorb or take up the coating substance. In practice we have used for a batch of fifty pounds of the porous material from three to four and one-half pints of the filling and coating material, depending somewhat upon the character of the latter. When an oleaginous substance is used as the filler and coating, we may employ a pure vegetable oil, or may employ a crushed oil bearing substance such as crushed linseed or cotton seed.

Our improved product has a very low specific gravity, is of a reddish color, is non-adhesive, and will burn away without leaving a residue when the molten metal is poured in the mold.

We claim as our invention:—

1. A parting powder composed of a dried, finely divided vegetable bark from which has been extracted in whole or in part the natural acids thereof, and a filling substance incorporated therewith, substantially as specified.

2. A parting powder composed of a dried, finely divided vegetable bark from which has been extracted in whole or in part the natural acids thereof, and a vegetable oil or oil bearing substance incorporated therein in substantially the proportions herein set forth.

In testimony, that we claim the foregoing as our invention we affix our signatures in the presence of two witnesses, this 28th day of February A. D. 1911.

ERNST C. KRUEGER.
JOHN W. MANN.

Witnesses:
WILLIAM L. HALL,
WILLIAM GOLDBERGER.

Copies of this patent may be obtained for five cents each, by addressing the "Commissioner of Patents, Washington, D. C."